United States Patent [19]

Bowers et al.

[11] Patent Number: 4,656,086
[45] Date of Patent: Apr. 7, 1987

[54] CLOTH COVERED PINCH WELT AND METHOD FOR MAKING SAME

[75] Inventors: Daniel W. Bowers, Otsego; Donald L. Wisser, Portage, both of Mich.

[73] Assignee: United Technologies Automotive, Inc., Dearborn, Mich.

[21] Appl. No.: 887,508

[22] Filed: Jul. 21, 1986

[51] Int. Cl.⁴ .................. B32B 3/26; B32B 7/04; B29D 7/00; B29C 67/00
[52] U.S. Cl. .................. 428/309.9; 264/45.9; 264/46.7; 264/46.9; 428/122; 428/126; 428/193; 428/317.5; 428/319.7
[58] Field of Search ............... 428/122, 123, 124, 126, 428/192, 193, 194, 309.9, 317.1, 317.5, 317.7, 319.3, 319.7, 319.9, 358; 264/45.9, 46.7, 46.9

[56] References Cited

U.S. PATENT DOCUMENTS

| | | | |
|---|---|---|---|
| 3,535,181 | 10/1970 | Yunan | 156/181 |
| 3,849,174 | 11/1974 | Ancker | 156/244 |
| 3,989,869 | 11/1976 | Neumaier | 428/254 |
| 4,003,777 | 1/1977 | Eddy | 156/246 |
| 4,104,430 | 8/1978 | Fenton | 428/175 |
| 4,221,623 | 9/1980 | Eslinger | 156/243 |
| 4,370,374 | 1/1983 | Raabe | 428/216 |
| 4,378,396 | 3/1983 | Urai | 428/198 |
| 4,381,273 | 4/1983 | Azzola | 264/45.9 |
| 4,493,871 | 1/1985 | Edgerley | 428/308.4 |

Primary Examiner—William J. Van Balen
Attorney, Agent, or Firm—Alan C. Cohen

[57] ABSTRACT

The present invention teaches a cloth covered pinch welt comprising a flexible, thermoplastic polymeric substrate extruded about a reinforcing member having a layer of partially embedded open cell foam material bonded to the polymeric substrate and wherein a cloth covering is bonded to the foam material. In addition a method for manufacturing the cloth covered pinch welt disclosed herein is also taught.

13 Claims, 5 Drawing Figures

CLOTH COVERED PINCH WELT AND METHOD FOR MAKING SAME

DESCRIPTION

1. Technical Field

The present invention relates to polymeric extruded articles, particularly decorative automotive components.

2. Background Art

Pinch welts have been used in the automotive industry for many years as protective and decorated guards to cover raw metal edges in automotive vehicles. Some of the more common areas where such devices are used is around sun roof openings, door openings and trunk openings.

However, often times the pinch welts are used next to attractive cloth covered components such as headliners or other cloth covered objects inside the vehicle. The pinch welt 2 is manufactured as an uncovered polymeric article such as shown in FIG. 1. The exposed polymeric surface results in different textures being next to one another, reducing the plush and harmonious appearance the manufacturer is trying to achieve.

The industry has experimented with wrapping or covering the polymeric pinch welt with a cloth material. However, the polymer is difficult to bond to and the adhesives which are required to bond the cloth to the substrate often seeps through the thin layer of cloth ruining its appearance. In addition this process of applying the cloth to the pinch welt in this way is costly.

Therefore, what is needed in the art is a cloth covered pinch welt which is covered by the same or similar cloth as the headliners or other cloth covered components in the automobile, is simple, inexpensive to manufacture, and is aesthetically pleasing.

DISCLOSURE OF THE INVENTION

The present invention discloses a cloth covered pinch welt comprising a flexible polymeric substrate extruded about a structural member. The polymeric substrate having bonded to it a cloth cover wherein an open cell, flexible foam material is positioned between the cloth cover and polymeric substrate and in which the foam serves the dual purpose of cushioning the cloth and bonding it to the polymeric substrate.

Another aspect of the invention is the method of making a cloth covered pinch welt by hot extruding a flexible polymeric substrate about a structural member contacting the hot substrate with an open cell, flexible foam surface of a foam backed cloth, thereby causing the foam to imbed into the polymeric substrate bonding the foam to the polymeric substrate. The bonded structure is then cooled to below the melt temperature of the polymeric substrate and formed into the desired shape.

The method of making a cloth covered pinch welt by hot extruding a flexible polymeric substrate about a structural member at a temperature exceeding the melt temperature of an open cell flexible foam, thereafter contacting the hot substrate with an open cell foam surface of a foam backed cloth, thereby melting the foam and bonding the polymeric substrate and the foam together. The bonding structure is then cooled to below the melt temperature of the polymeric substrate and formed into the desired shape.

Yet another aspect of the invention is a method of making a cloth covered pinch welt by hot extruding a flexible polymeric substrate about a structural member, heating the surface of an open cell, flexible foam backed cloth causing the surface of the foam to melt, contacting said melted foam surface with the hot extruded flexible polymeric substrate thereby causing the foam to bond to the polymeric substrate. The bonded structure is then cooled to below the melt temperature of the foam and formed into the desired shape.

Other features and advantages will be apparent from the specification and claims and from the accompanying drawings which illustrate an embodiment of the invention.

BEST MODE FOR CARRYING OUT THE INVENTION

The structural member useful in this invention may be any of the commonly used structural supports to make conventional pinch welts. These may take the shape of rods, a thin metal sheet, strip sheet or double carry strip sheets, etc. These are typically made of cold roll steel, however, other metals, i.e. aluminum, copper, etc. as well as nonmetallic materials may be used and are known to those skilled in the art.

Figure 1:
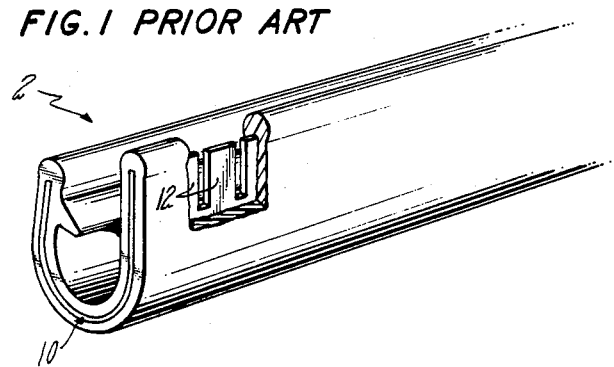
FIG. 1 is an end view shown in perspective of a prior art pinch welt.
Figure 3:
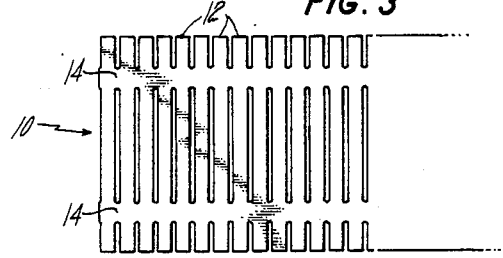
FIG. 3 is an enlarged top view of the preferred segmented structural member.

The choice of material and configuration of the carrier are a function of the particular shape desired of the final article and its physical properties. The preferred material is a double carry strip sheet (FIG. 3) which is available from E&D Manufacturing Company of Warren, Mich. and Arrowhead Industries Inc. of Valley City, Ohio. The support may be any thickness, however, it will typically be about 0.016 inch to about 0.020 inch, with about 0.018 inch preferred. The support will usually be about ¾ inch to about 2 inches wide with about 1 inch preferred. The material must be strong enough and thick enough to give good support to the pinch welt after forming, but should not be too strong or thick that it is difficult to form in subsequent forming processes.

Figure 2:
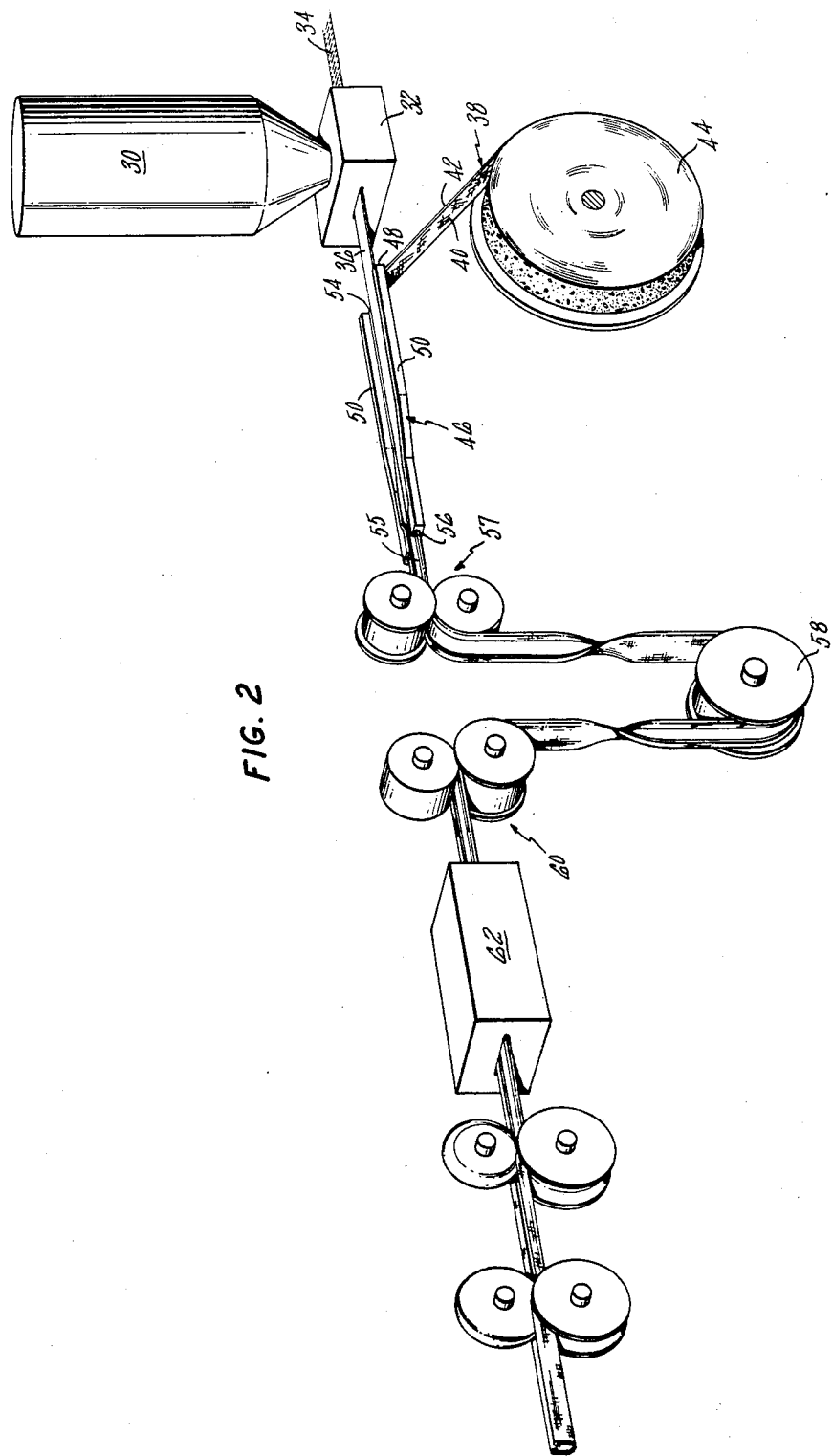
FIG. 2 is a diagrammatic view of the extrusion and bonding line.

The preferred carrier is the double carrier strip 10, (FIG. 2). It is a segmented series of metal strips 12 positioned substantially parallel to one another, all of which are held in position by at least one continuous strip 14 which is substantially perpendicular to each of the metal strips 12 and connected to each one. This carrier, in its segmented configuration, is strong yet easily formed into the final pinch welt shape.

The polymeric material which is used as the substrate and which is hot extruded about the carrier may be any of the flexible thermopolymeric materials such as polyvinyl chloride, ethylene-vinyl acetate, polyethylene and thermopolymeric rubber. The primary requirements for these materials is that they be flexible and are capable of being extruded about the structural member and formed in the particular shape of the pinch welt. Additionally, in the preferred method for manufacturing these pinch welts, it is desirable to select a polymer which, when it is contacted with the foam, has a low enough viscosity to allow the polymer to flow into the open cells of the foam or allows the foam to be embedded into the melted polymer. This is typically achieved by contacting the foam backing to the extruded polymer directly after the polymers exit from the extruder head so that it is still in the molten state.

The term embed or embedded, for purposes of this invention, refers to either forcing the foam cell surface into the surface of the soft polymeric material or where the polymeric material fills the foam cells in contact with it. In either case, the intent is to cause the foam material in contact with the polymeric surface to become surrounded by and bound to the polymer layer when the polymeric material cools and solidifies.

Typically, the thickness of the extruded polymeric material will be about 60 mils to 100 mils with about 80 mils preferred. The polymeric material typically will be extruded at temperatures about 148.9° C. (300° F.) or higher with temperatures ranging from about 173.9° C. (345° F.) to about 187.8° C. (370° F.) being preferred. The preferred material is flexible polyvinyl chloride having a shore durometer hardness ranging from about 50 shore A to about 40 shore D. Again the material may be extruded in excess of these temperatures and then allowed to cool to a compatable temperature with the foam urethane.

The cloth covering may be any material to which the foam can be applied. Typically, since these pinch welts are generally used in automobiles or trucks, materials such as polyester, nylon or other synthetic material is used because of their durability and compatibility with similar cloth covered areas already used in these vehicles. However, cotton or other material may be used if desired.

The preferred material to use is a brushed nylon material, such as that used in making head liners for automobiles. This material may be purchased already having a foam urethane backing affixed to it from Shamutt Mills of West Bridgewater, Mass. as alpine cloth. The thickness of the cloth will vary, however, it will typically range from about 0.060 inch to about 0.125 inch with about 0.080 inch to about 0.100 inch preferred. Other sources for similar type materials would be known to one skilled in the art.

The foam may be any flexible foam material which is compatible with the extrusion temperature for the polymeric substrate. The foam will ideally be bonded to the cloth sheet to form a unitary structure prior to bonding the foam to the polymeric, this will be primarily for ease of manufacture when applying it to the polymeric substrate. Techniques for doing this are known to those skilled in the art.

The preferred foam which may be used to practice this invention is a flexible, open cell polyurethane polyester based foam. The thickness of the foam layer is not critical, however there must be sufficient material present to bond the cloth to the substrate yet not so thin that all of the foam cells will either be filled with the hot polymer or melted during the bonding process. It is important to have several layers of unfilled, intact cells for two reasons.

First, it is advantageous that a considerable foam layer be left intact to give the pinch welt a soft, plush feel when touched.

Second, this layer of compressible foam between the cloth and the substrate allows the covered pinch welt to be easily formed into the desired final shape without stressing the cloth. Typically, the substrate is extruded in a flat shape FIG. 4 and the cloth is bonded to it while it is in that shape. The covered substrate is then formed into a U-shape configuration, FIG. 5, by roll forming or other technique which bends the polymeric substrate and the structural member to the desired shape. Clearly, when the extruded substrate undergoes the shaping process, the flat substrate undergoes localized elongation about the external surface of the substrate to which the cloth covering is applied. This results in the stretching of the cloth covering about this external dimension as the flat structure is formed into the U-shape. Such a process stretches the cloth about the U-shape which may cause the cloth to become too taut or tear resulting in it having an unacceptable appearance. However, when sufficient foam is left after bonding, the layer of foam between the cloth cover and the substrate can be compressed during this U-forming process resulting in a non-stressed covering. Therefore, a sufficiently thick layer of foam is required to avoid these undesirable effects. This thickness will be a function of the type of foam used and the amount of stretching required of the backing material and would be easily determined by one skilled in the art. It is believed that in the typical range of foam thickness suggested below, that about 50 percent or greater of the foam layer should remain unimpregnated.

The thickness of the foam backing will typically be about 0.050 inch to about 0.110 inch thick with about 0.070 to about 0.080 inch thick preferred. The amount of unimpregnated or intact foam remaining is difficult to determine, however, it is likely that greater than 50 percent of the foam thickness will remain in the desired state. Again, it is desirable to have sufficient foam remaining after bonding to result in the advantages described above.

The open cell foam may be applied to the cloth backing using conventional techniques. However, since this material is in many instances already available as foam backed cloth, it is much simpler to merely purchase the foam backed cloth commercially for this process.

One particularly preferred foam material is an open cell 100 percent polyurethane, polyester based foam applied to a nylon cloth backing. This material is available from Shamutt Mills of West Bridgewater, Mass. and is used to manufacture head liners for automobiles. This makes it doubly attractive as the single piece cloth-/urethane foam unit is easily used in this process and is made of the identical material which is used for many adjacent components in the automobile thereby resulting in an aesthetically attractive product.

The method for manufacturing these pinch welts incorporates a number of conventional processes, for hot extruding the polymeric substrate onto the carrier, cooling the substrate and forming it into the desired shape. The unique feature is the application of a cloth covering onto the substrate.

It should be noted that this invention should not be limited to pinch welts of any particular configuration and that the U-shape configuration is illustrative only.

Figure 4:
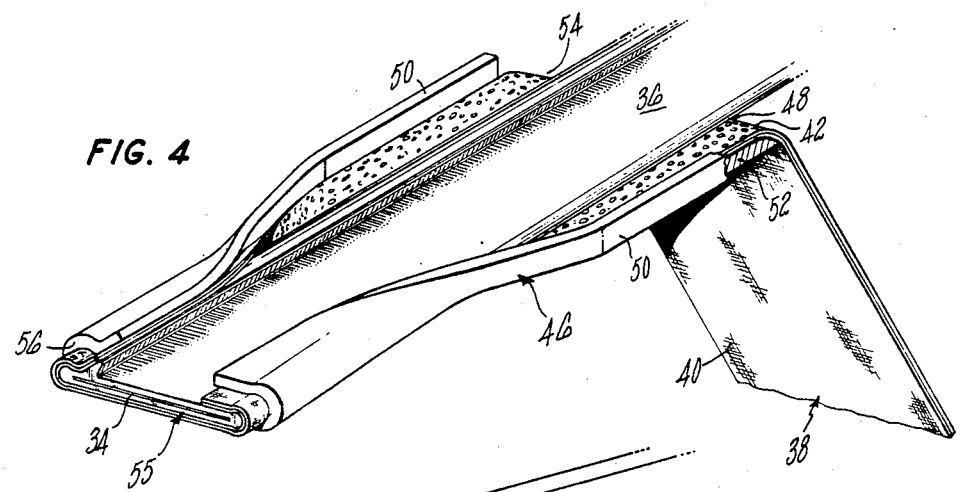
FIG. 4 is an enlarged view of the cloth bonding applicator.

As may be seen in FIG. 2, the polymeric material is placed in a heated hopper 30, in which the polymeric material is melted and then forced through a heated extruder 32; (preferably a cross head extruder, the temperature of which is about 148.9° C. (300° F.) or higher), all of which are conventional. As the polymeric material is extruded the structural carrier 34 is passed into the extruder head wherein the polymeric material is extruded about it, forming a polymeric coated carrier 36. As the coated carrier 36 exits the extruder head it is still very hot, typically about 148.9° C. (300° F.) or higher and the polymeric substrate is still in a softened state. At this point in the process, the foam backed cloth material 38 is brought in contact with the hot polymeric coating of the coated carrier 36. It is at this point that the foam is imbedded into and bonded to the substrate. This process is best viewed in FIG. 2 where the steel carrier 34 passes into the die head 32 and is coated with the polymeric substrate to form the coated carrier 36. At this time, the foam urethane backed cloth 38, having a cloth surface 40 and a foam surface 42 is fed from a roll 44 to the cloth applicator fixture 46 (FIG. 4). The cloth 38 with the foam surface 42 is fed into the fixture 46 at point 48 such that the foam surface 42 is contacted to the hot polymeric substrate. The cloth applicator 46 (FIG. 4) has two parallel walls 50 on either side of a floor plate 52. The floor and walls are designed to describe a taper such that the fixture is wider at the entrance end 54 of the applicator and smaller at the exit end 56 of the cloth applicator 46. The width of the entrance 54 is substantially the same width as the cloth 38 while the taper should narrow down to the width of the polymeric coated carrier 36. Typically, the cloth will have a greater width by about 0.25 times. This is done to allow for ample cloth to wrap about the edges of the substrate as it passes through the tapered segment. Naturally, it is desirable that the polymeric coated substrate be brought into contact as close to the center of the cloth material as possible to evenly cover the substrate.

The coated carrier is then passed between one or more devices which apply pressure to the cloth and the polymeric substrate forcing the soft polymer into the open cells of the foam or embedding the foam into the polymer and enhancing the bond of the foam layer between them. This should be done while the polymeric material still has a low enough viscosity to flow into the foam cells or allow the foam to be embedded into its surface. The depth of the bonding zone formed will typically be up to about one-half of the foam layer thickness or about 0.025 to about 0.055 inch. The preferred method is to pass the coated carrier between or about steel rollers. In FIG. 2, the covered coated carrier 55 is passed between rollers 57 the covered carrier is then rotated or twisted so that the cloth surface will contact a turn around roller 58 prior to passing through a second set of rollers 60 (FIG. 2).

After the cloth has been embedded into the polymeric substrate, it is cooled as in chamber 62 to below about 26.6° C. (80° F.) to solidify the bond. This may be done with fans or liquid nitrogen, dry ice, etc. Liquids which would normally be used for this cooling process where only the polymeric substrate is being processed may be used but are not recommended because of the possible detrimental effects to the cloth backing. However, should such materials be compatible then there is no reason not to use them. The cooling makes the polymeric substrate less compliant and more easily formed in the roll forming process.

The cooled cloth covered polymeric carrier is then formed, typically using conventional roll forming procedures into the desired form.

Such roll forming devices are conventional and known to those skilled in the art. Such forming machines bend or break the structural member and bend the flat structure to conform it to a desired form. Typically, the form will be a U-shape to allow for easy application about the edge of the structure to be covered. However, other forms may be made to fit a particular use.

An alternative method for bonding the foam layer to the substrate would be to extrude the polymeric material at a temperature high enough to melt the foam layer when it contacts the polymeric substrate thereby bonding it to the substrate, then cooling the bonded article to below the melt temperature of the foam and the polymeric substrate, thereafter forming it into the desired shape.

Yet another method which may be used to form these cloth covered polymeric pinch welts would be to extrude the polymeric substrate and then heat the foam layer of the foam backed cloth covering to cause the foam to partially melt and then contacting the partially melted foam to the heated extruded polymeric substrate, again causing the foam to bond with the polymeric substrate, then cooling the bonded article to below the melt temperature of the urethane foam and form it into the desired shape. Again, as with the original and preferred method of manufacture, it is desirable that not all of the foam layer be melted during these processes for the reasons stated above.

Figure 5:
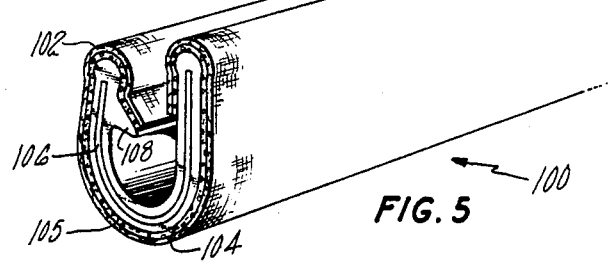
FIG. 5 is an enlarged end view shown in perspective of the present cloth covered pinch welt.

A pinch welt of the present invention is shown in FIG. 5. In the drawing, a U-shaped pinch welt 100 is depicted having a cloth covering 102. An intact sponge open cell foam urethane layer 104 and a bonded urethane layer 105 is formed when the urethane foam is imbedded into the polymeric substrate during the bonding process. Additionally, the structural member 106 is also depicted as well as a flange 108 which was formed in the polymeric material upon extrusion and is helpful in affixing the pinch welt to the substrate to be covered.

The pinch welts of the present invention offer an attractive alternative to the present polymeric welt. The pinch welts are inexpensive to manufacture, as they use conventional techniques and available materials, yet result in decorative pinch welts which enhance the warmth and decor of the vehicles they are used in.

It should be understood that the invention is not limited to the particular embodiments shown and described herein, but that various changes and modifications may be made without departing from the spirit and scope of this novel concept as defined by the following claims.

We claim:

1. A method for manufacturing a cloth covered polymeric pinch welt comprising:
    a. hot extruding a thermoplastic polymeric material about a reinforcing member thereby forming a polymeric coated substrate;
    b. contacting said hot polymeric coated substrate, with a flexible open cell foam backed cloth material, wherein the foam is caused to embed into the surface of the polymeric substrate, thereby bonding said cloth material to said polymeric material forming a cloth covered polymeric substrate;
    c. cooling said bonded cloth covered polymeric substrate to below the melt temperature of the polymeric material to solidify the bond;
    d. forming said cooled, bonded cloth covered substrate to the desired shape.

2. The method of claim 1, wherein the polymeric material is a flexible polyvinyl chloride.

3. The method of claim 2 wherein the cloth is a brushed nylon knit or polyester fabric; having at least one surface coated with an open cell foam urethane polyester based material.

4. The method of claim 3 wherein the reinforcing member is a metal carrier.

5. The method of claim 4 wherein the bonded, cloth covered substrate is cooled to below 26.6° C. (80° F.) and is formed into its final shape by passing the coated article through a roll forming process.

6. A cloth covered pinch welt comprising a flexible, thermoplastic polymeric substrate extruded about a reinforcing member, a layer of flexible open cell foam material partially imbedded into the polymeric substrate, said foam covered with a layer of cloth.

7. The article of claim 6 wherein the polymeric substrate is flexible polyvinyl chloride.

8. The article of claim 7 wherein the reinforcing member is metallic.

9. The article of claim 7 wherein the cloth covering is brushed nylon.

10. The article of claim 7 wherein the open cell foam is a flexible open cell urethane, polyester based material.

11. A method for manufacturing a cloth covered polymeric pinch welt comprising:
   a. hot extruding a thermoplastic polymeric material about a reinforcing member thereby forming a polymeric substrate;
   b. contacting said hot polymeric substrate, with a flexible open cell foam backed cloth material, wherein the temperature of the substrate exceeds the melt temperature of the foam, thereby melting said foam and bonding said foam backed cloth to said polymeric material forming a cloth covered substrate;
   c. cooling said bonded cloth covered polymeric substrate to below the melt temperature of the foam urethane backing;
   d. forming said cooled, bonded cloth covered substrate to the desired shape.

12. A cloth covered pinch welt comprising a flexible, thermoplastic polymeric substrate extruded about a reinforcing member, a layer of partially melted flexible open cell foam material covered with a layer of cloth wherein said melted foam acts as the adhesive to bond the cloth to the polymeric substrate.

13. A method for manufacturing a cloth covered polymeric pinch welt comprising
   a. hot extruding a thermoplastic polymeric material about a reinforcing member thereby forming a polymeric substrate;
   b. heating the flexible open cell foam backing of a foam backed cloth material to cause a portion of said foam material to melt;
   c. contacting said hot polymeric substrate with said heated partially melted surface of said foam backed cloth material, thereby bonding said cloth material to said polymeric material forming a cloth covered substrate;
   d. cooling said bonded cloth covered polymeric substrate to below the melt temperature of the foam backing;
   e. forming said cool bonded cloth covered substrate to the desired shape.

* * * * *